United States Patent [19]

Servais et al.

[11] 4,427,488

[45] Jan. 24, 1984

[54] METHOD OF MODIFYING THE LIGHT-REFLECTING PROPERTIES OF GLASS

[75] Inventors: Albert Servais, Gerpinnes; Francois Toussaint, Montigny-le-Tilleul; Hugo Rogghe, Mol, all of Belgium

[73] Assignee: Glaverbel, Brussels, Belgium

[21] Appl. No.: 396,254

[22] Filed: Jul. 8, 1982

[30] Foreign Application Priority Data

Jul. 10, 1981 [GB] United Kingdom ............... 8121367

[51] Int. Cl.³ .................... B44C 1/22; C03C 15/00; C03C 25/06
[52] U.S. Cl. .................... 156/663; 65/31; 156/640; 156/345; 252/79.3

[58] Field of Search .............. 156/636, 635, 637, 639, 156/640, 663, 345; 65/31; 252/79.3

[56] References Cited

U.S. PATENT DOCUMENTS 2,067,925  1/1937  Clayton-Kennedy ............ 252/79.3
3,839,113  10/1974  Yoshida et al. ................ 156/663 X Primary Examiner—William A. Powell
Attorney, Agent, or Firm—Spencer & Frank

[57] ABSTRACT

A method of modifying the light-reflecting properties of a surface of a glass article by etching the surface with acid. The method includes the steps of smoothly applying to the surface of the article a uniform film of acid that is sufficiently thin so that quantities of the acid are prevented from flowing across the surface of the article and subsequently rinsing the article.

19 Claims, 6 Drawing Figures

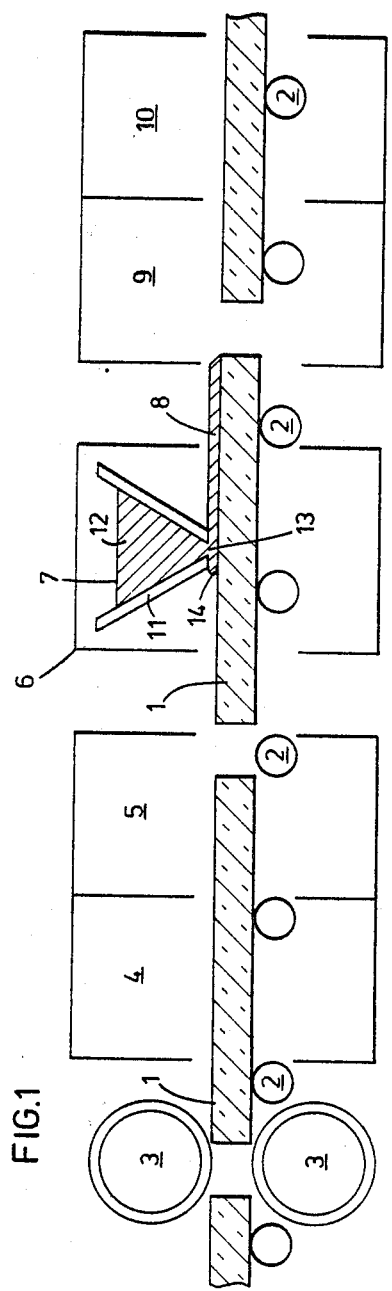
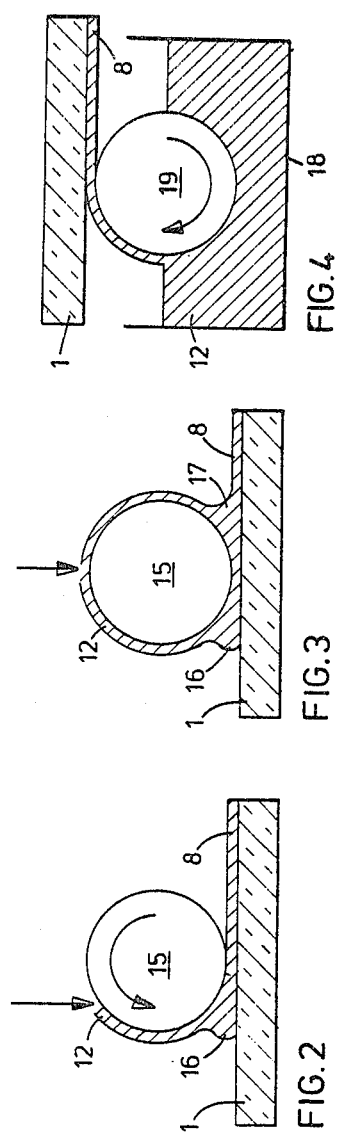
FIG.1
FIG.2
FIG.3
FIG.4

FIG.5
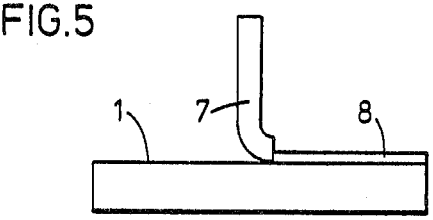
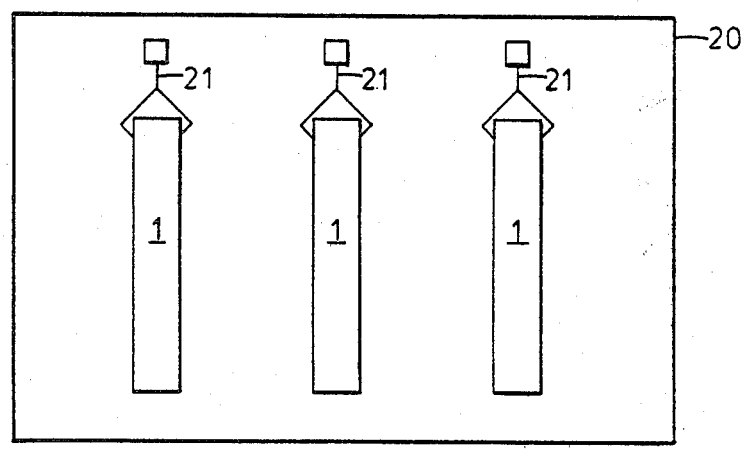
FIG.6

METHOD OF MODIFYING THE LIGHT-REFLECTING PROPERTIES OF GLASS

BACKGROUND OF THE INVENTION

The present invention relates to a method of modifying the light-reflecting properties of the surface of a glass article, and more particularly to such a method which includes contacting the article with etching acid and subsequently rinsing it.

Various methods of modifying the light-reflecting properties of a glass surface are of course extremely well known. In perhaps the simplest method, the articles of glass are simply dipped into a bath of etching acid, withdrawn and rinsed. It is found that if rinsing is not performed immediately after withdrawal from the bath, the effect of the etching acid will in general be non-uniform due to the presence of excess droplets of acid still clinging to the surface. But it has also been found that the mere act of dipping, by itself, tends to render the treatment non-uniform, presumably because flow currents along the surface of the article as it is immersed and withdrawn, and convection currents within the bath, render the potency of the acid non-uniform from place to place on the glass surface.

It has also been proposed to spray-coat an article with etching acid. This however can lead to pitting.

SUMMARY OF THE INVENTION

An object of the present invention is to provide an alternative way of applying etching acid to a glass article which enables these defects to be reduced or eliminated.

According to the present invention, there is provided a method of modifying the light-reflecting properties of the surface of a glass article by etching the surface with acid, wherein the method includes smoothly applying to the surface of the article a uniform film of acid which is sufficiently thin so that quantities of acid are prevented from flowing across the surface of the article and subsequently rinsing the article.

By adopting the present invention, it is possible to achieve very uniform treatment of a glass surface. Prior proposals have given rise to problems of uneven modifications of the glass surface. This defect has been found to be due to stirring or flow of the acid while it is in contact with the glass which brings different concentrations of acid into contact with the glass surface. This in turn has a disadvantageous effect on the growth and uniformity of the surface crystals formed during the treatment. This problem can be substantially avoided by the present invention.

In some embodiments of the invention, etching acid vapour is caused to condense on the glass surface to form a thin film on such surface. Preferably, however, said acid is caused to transfer smoothly from an applicator to the glass while the applicator and the glass are relatively displaced.

Evenness of the applied acid coating is enhanced if, while said applicator and said glass are relatively displaced, they are spaced apart by a gap of no more than 1 mm and advantageously between 0.1 and 0.5 mm, as is preferred.

Smooth transfer of acid to the glass is facilitated when the acid is applied to the glass via the applicator with a pressure head of at most 10 cm H₂O, and preferably between 4 and 8 cm H₂O.

Preferably, the acid is caused to form a bead between the glass surface and the applicator due to surface tension effects, since this further promotes evenness of application of the acid.

In yet another preferred embodiment of the invention, said acid is caused to flow through at least one orifice of an applicator to form a continuous curtain between the applicator and the glass. It is particularly easy to effect a smooth transfer of the acid to the glass in this way.

The glass is preferably washed before passing beneath the acid curtain so as to remove all traces of dirt and dust which would have a deleterious effect on the uniformity of the etching, and it is also preferred that prior to said washing, the glass passes between the nip of fabric-covered rollers. The fabric used is preferably felt. This also assists in the removal of dust and dirt.

It is especially suitable to use an acid composition having a surface tension in the range 35 to 60 dyne/cm and optimally in the range 45 to 55 dyne/cm.

It is also highly desirable, particularly when applying acid via an applicator, to avoid wide differences in temperature between the acid and the glass to which it is applied, and it is accordingly preferred that said acid and said glass have temperatures within 5° C. of one another at the time of applying the acid.

Preferably said glass article is a sheet or ribbon which is conveyed through acid applying and rinsing stations, and said rinsing is effected by spraying a curtain of rinsing liquid onto the glass. The speed of the glass sheet or ribbon during its conveyance and the spacing of the acid applying and rinsing stations can easily be set to give a desired acid contact time.

In a preferred embodiment of the invention, the acid applying and rinsing positions are so spaced and the speed of displacement of the glass is such that the acid contact time is less than 20 seconds.

It is convenient to apply etching acid at a rate between 0.3 and 0.7 L/m² of glass.

BRIEF DESCRIPTION OF THE DRAWINGS

Various ways of performing the present invention will now be described with reference to the accompanying drawings in which:

FIG. 1 illustrates a production line according to the invention in which a glass sheet is conveyed successively through washing and drying stations to an acid applying station and thence to further washing and drying stations;

FIGS. 2 to 6 illustrate alternative ways of applying the etching fluid according to the invention.

DESCRIPTION OF THE PREFERRED EMBODIMENTS

In FIG. 1 horizontally disposed glass sheets such as 1 are conveyed on a conveyor 2 between the nip of a pair of felt covered rollers 3 to remove any debris on the surfaces of the glass. The glass travels into a washing station 4 where it is suitably washed using a detergent. In fact the washing station 4 may incorporate a rinsing station (not shown) where any detergent can be removed. Then the glass passes into a drying chamber 5 where it is dried in warm air. The glass then travels to the acid applying station 6 which includes means 7 for applying a thin uniform film 8 of etching acid to the glass in a smooth manner without causing quantities of acid to flow across the glass surface. After leaving the acid applying station 6 the acid composition is allowed to react with the glass surface for as long as is required whereupon the glass 1 bearing the acid film 8 enters a rinsing station 9, where residual acid and reaction products are washed off, and then enters a final drying chamber 10.

The means 7, as illustrated in FIG. 1, for applying the thin film 8 of acid is a preferred embodiment of an acid applicator for use in this invention. A glass sheet 1 is conveyed beneath a member 11 which is shown as being of V shape and containing a reservoir of etching fluid 12. This member 11 (whose upper parts may be of any convenient shape) is provided at its base with an elongate slot 13 through which acid composition can flow to form a meniscus 14 against the glass which defines a bead of the acid composition so that as the glass is drawn along under the applicator, a thin flim 8 of the acid compositon is formed.

The slot is preferably less than 1 mm from the glass, it may for example be 0.5 mm from the glass. The slot opening is preferably in the range 0.1 to 0.15 mm.

In a particular example, acid composition No. 1, in the table below, was passed through a slot 0.1 mm wide and 0.5 mm above the glass at a rate of 400 mL/m² of glass to be treated, the glass travelling past the slot at a speed of 7.5 m/minute.

In a variant of the applicator of FIG. 1, the slot 13 is replaced by a plurality of closely spaced holes so arranged that a continuous meniscus such as that shown at 14 is produced.

Five suitable acid compositions for performing the present invention have been made up using 88 mL of 70% HF (aqueous), which is brought up to 200 mL using sulphuric acid of various strengths and then adding 30 g $NH_4F.HF$. Characteristics of these compositions are given in the following table. In two of these compositions water was later added in the amounts indicated.

| Composition No. | $H_2SO_4$ Strength °Baume | Added Water | S.T. Dyne/cm |
| --- | --- | --- | --- |
| 1 | 41 | 10% | 48.5 |
| 2 | 41 | — | 48.9 |
| 3 | 50 | — | 37 |
| 4 | 33 | — | 48.1 |
| 5 | 41 | 25% | 51.1 |

The added water content is given as a percentage by volume of the other constituents.

Measurements of surface tension were made by the platinum ring extraction method at 20° C.

It is suitable to apply such an acid composition at a flow rate of between 0.3 and 0.7L/m² glass with a pressure head less than 10 cm $H_2O$ and preferably between 4 and 8 cm $H_2O$.

The glass and acid composition are preferably at substantially the same temperature when they come into contact.

The speed of the glass as it passes along the conveyor 2 may be of the order of 7 to 10 m/min and the washing chamber 9 is preferably spaced from the acid applying station by a distance to give a maximum dwell time of about 20 seconds. This time may of course be adjusted depending on the modification in the reflective properties required. In some cases a dwell time of 10 seconds is sufficient.

FIGS. 2 to 6 illustrate alternative means for applying the acid compositions which may be incorporated into the acid applying station 6 of FIG. 1.

In FIG. 2 etching fluid 12 is poured in the direction of the arrow onto an upper surface of an inert clyinder 15 which rotates anticlockwise as shown and is closely spaced from the glass 1 so as to flow down one side of the cylinder and form a meniscus 16. As the glass is carried along to the right of the drawing, additional areas of the surface are contacted by the meniscus where they are wetted by the acid composition which is carried beneath the cylinder 15 to leave a thin uniform coating on the glass.

FIG. 3 shows a generally similar applicator, but in this case the acid composition is caused to flow over the whole surface of a stationary inert cylinder 15 so that a second meniscus 17 is formed between the fluid 12 and the thin film 8.

FIG. 4 illustrates an alternative embodiment for coating the underside of the glass sheet 1. Acid composition 12 is contained in a reservoir 18 beneath the path of the glass. A roller 19 is part submerged in the acid composition and at its top closely approaches the glass 1 so that as the roller rotates it picks up acid composition from the reservoir 18 and transfers it as a thin film 8 to the glass.

FIG. 5 illustrates another alternative embodiment in which the means 7 for applying the thin film 8 of acid consists of a piece of felt or other material which is drenched in the acid composition and continually fed with more acid during the course of the treatment.

FIG. 6 illustrates yet another of the ways in which etching acid can be caused to react with the surface of a glass sheet. In FIG. 6 three glass sheets 1 are held inside a chamber 20 by conveyor means 21. The chamber 20 which constitutes the acid applying station 6 is filled with etching acid vapours which are allowed to condense onto the sheets 1 to form thin uniform films. After such films have condensed, the sheets are removed and after a suitable period they pass to the washing station.

Glass which has been treated by a method according to the invention is particulary suitable for use as a cover for a photographic diapositive and is found to avoid the appearance of interference fringe phenomena such as Newton's rings which may arise if the diapositive and glass sheet are not strictly parallel.

If the acid composition is allowed to remain in contact with the glass for a sufficient length of time, the modification in the reflective properties of the glass sheets produced by a method according to the invention may be such as to make the sheets particularly suitable for use as so-called "non-reflective" covers for pictures and other works of art.

We claim:

1. A method of modifying the light-reflecting properties of the surface of a glass article by etching the surface with acid, said method comprising: smoothly applying to the surface of the article a uniform liquid film of acid which is sufficiently thin so that quantities of the acid are prevented from flowing across the surface of the article; and subsequently rinsing the article.

2. A method according to claim 1, wherein an applicator is provided for transferring acid to the article, said method further including displacing the applicator and the article relative to each other, and said applying step includes causing the acid to transfer smoothly from the applicator to the surface of the article while the applicator and the article are relatively displaced.

3. A method according to claim 2, further including spacing apart the applicator and the surface of the article by a gap of no more than 1 mm during said displacing step.

4. A method according to claim 3, wherein the gap is between 0.1 and 0.5 mm.

5. A method according to claim 2, wherein said applying step includes applying the acid to the surface of the article via the applicator with a pressure head of at most 10 cm $H_2O$.

6. A method according to claim 5, wherein the pressure head is between 4 and 8 cm $H_2O$.

7. A method according to claim 2, wherein said applying step includes causing the acid to form a bead between the surface of the article and the applicator due to surface tension effects of the acid.

8. A method according to claim 2, wherein the applicator is provided with at least one orifice and said applying step includes causing the acid to flow through the at least one orifice of the applicator to form a continuous curtain between the applicator and the surface of the article.

9. A method according to claim 8, wherein said applying step includes passing the article beneath the acid curtain, and said method further includes washing the article before passing it beneath the acid curtain.

10. A method according to claim 9, further including providing fabric covered rollers and passing the article between the nip of the fabric covered rollers prior to said washing step.

11. A method according to claim 10, wherein the fabric of the fabric-covered rollers is felt.

12. A method according to claim 1, further including providing the film of acid with a surface tension in the range 35 to 60 dyne/cm.

13. A method according to claim 12, wherein the surface tension range is 45 to 55 dyne/cm.

14. A method according to claim 1, further including subjecting the acid and the article to temperatures within 5° C. of one another during said applying step.

15. A method according to claim 2, wherein the glass article is a sheet or riboon, and said method further includes performing said applying and rinsing steps at acid transfer and rinsing stations, respectively, and said displacing step includes conveying the glass through the acid transfer and rinsing stations, and said rinsing step is effected by spraying a curtain of rinsing liquid onto the surface of the article.

16. A method according to claim 15, wherein the acid transfer station and the rinsing station are spaced apart and said displacing step includes conveying the glass at a speed of displacement such that the acid remains on each portion of the surface of the article for a period of less than 20 seconds.

17. A method according to claim 1, wherein said applying step includes applying the acid at a rate between 0.3 and 0.7 L/m$^2$ of the article.

18. A method according to claim 1, wherein said applying step includes applying the acid to the surface of the article while maintaining the surface of the article substantially horizontal.

19. A method according to claim 1, wherein said applying step includes maintaining the acid in contact with the surface of the article a sufficient amount of time so as to produce a non-reflective surface.

* * * * *